(12) United States Patent
Wang et al.

(10) Patent No.: US 12,021,722 B2
(45) Date of Patent: Jun. 25, 2024

(54) DETECTING NETWORK EVENTS HAVING ADVERSE USER IMPACT

(71) Applicant: Juniper Networks, Inc., Sunnyvale, CA (US)

(72) Inventors: Jisheng Wang, Palo Alto, CA (US); Jing Cheng, San Jose, CA (US); Abhiram Madhugiri Shamsundar, San Jose, CA (US); Randall Frei, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/812,676

(22) Filed: Jul. 14, 2022

(65) Prior Publication Data

US 2023/0308374 A1 Sep. 28, 2023

Related U.S. Application Data

(60) Provisional application No. 63/322,545, filed on Mar. 22, 2022.

(51) Int. Cl.
*H04L 43/0876* (2022.01)
*H04L 41/0631* (2022.01)
*H04L 43/062* (2022.01)
*H04L 45/48* (2022.01)

(52) U.S. Cl.
CPC ...... *H04L 43/0876* (2013.01); *H04L 41/0631* (2013.01); *H04L 43/062* (2013.01); *H04L 45/48* (2013.01)

(58) Field of Classification Search
None
See application file for complete search history.

(56) References Cited

U.S. PATENT DOCUMENTS 9,729,439 B2 8/2017 McLampy et al.
9,729,682 B2 8/2017 Kumar et al.
9,762,485 B2 9/2017 Kaplan et al.
(Continued)

OTHER PUBLICATIONS

Juniper Networks, Inc., "Resolution Guide—EX—Troubleshoot Spanning Tree Protocol (STP)", Feb. 20, 2012, 9 pp., Retrieved from URL: https://kb.juniper.net/InfoCenter/index?page=content&id=KB22774&actp=METADATA.
(Continued)

*Primary Examiner* — Anh Nguyen
(74) *Attorney, Agent, or Firm* — Shumaker & Sieffert, P.A.

(57) ABSTRACT

A method includes receiving, by a network management system, network data from a plurality of network devices configured to provide a network at a site; receiving, by the processing circuitry, user impact data from a plurality of client devices that access the network at the site; determining, based on the network data, a pattern of one or more network events occurring over time; correlating in time the pattern of the one or more network events to an adverse user impact event indicated by the user impact data received from the plurality of client devices; and determining, in response to the correlating, an instance of overwhelming network traffic having an adverse user impact. In some examples, the network data includes network traffic impact data, such as a number of packets dropped at a switch port due to congestion.

19 Claims, 6 Drawing Sheets

(56) References Cited

U.S. PATENT DOCUMENTS

| | | | |
|---|---|---|---|
| 9,832,082 B2 * | 11/2017 | Dade | H04L 43/04 |
| 9,871,748 B2 | 1/2018 | Gosselin et al. | |
| 9,985,883 B2 | 5/2018 | MeLampy et al. | |
| 10,200,264 B2 | 2/2019 | Menon et al. | |
| 10,277,506 B2 | 4/2019 | Timmons et al. | |
| 10,432,522 B2 | 10/2019 | Kaplan et al. | |
| 10,862,742 B2 | 12/2020 | Singh | |
| 10,958,537 B2 | 3/2021 | Safavi | |
| 10,958,585 B2 | 3/2021 | Safavi | |
| 10,985,969 B2 | 4/2021 | Safavi | |
| 11,075,824 B2 | 7/2021 | McCulley et al. | |
| 2011/0126054 A1 * | 5/2011 | Hayward | G06F 11/0709 714/E11.029 |
| 2013/0094361 A1 * | 4/2013 | Kulkarni | H04L 45/48 370/235 |
| 2016/0065419 A1 | 3/2016 | Szilagyi et al. | |
| 2016/0285717 A1 * | 9/2016 | Kim | H04L 41/0631 |
| 2017/0065892 A1 | 3/2017 | Loeb | |
| 2019/0196894 A1 | 6/2019 | Cherbakov et al. | |
| 2021/0028973 A1 * | 1/2021 | Côté | H04L 41/145 |
| 2021/0250222 A1 | 8/2021 | Boussac | |
| 2021/0306201 A1 | 9/2021 | Wang et al. | |
| 2022/0174503 A1 * | 6/2022 | Kounev | G06N 20/00 |
| 2023/0231785 A1 * | 7/2023 | Kumar | H04L 41/0631 709/224 |

OTHER PUBLICATIONS

U.S. Appl. No. 17/303,222, filed May 24, 2021, naming inventors Safavi.
U.S. Appl. No. 63/299,733, filed Jan. 14, 2022, naming inventors Wang et al.
Extended Search Report from counterpart European Application No. 22214651.6 dated Jul. 11, 2023, 10 pp.
Response to Extended Search Report dated Jul. 11, 2023, from counterpart European Application No. 22214651.6 filed Mar. 25, 2024, 28 pp.

* cited by examiner

DETECTING NETWORK EVENTS HAVING ADVERSE USER IMPACT

This application claims the benefit of U.S. Provisional Patent Application No. 63/322,545, filed on Mar. 22, 2022, the entire content of which is incorporated herein by reference.

TECHNICAL FIELD

The disclosure relates generally to computer networks and, more specifically, to detecting, troubleshooting, and remediating network issues.

BACKGROUND

A computer network is a collection of interconnected computing devices that can exchange data and share resources. In a packet-based network, such as the Internet, the computing devices communicate data by dividing the data into variable-length blocks called packets, which are individually routed across the network from a source device to a destination device. The destination device extracts the data from the packets and assembles the data into its original form.

Network providers and organizations (e.g., enterprises) may have networks that include multiple layers of gateways, routers, switches, and access points. Commercial premises or sites, such as offices, hospitals, airports, stadiums, or retail outlets, often install complex wired and wireless network systems, including a network of wireless access points (APs), throughout the premises to provide wireless network services to one or more wireless client devices (or simply, "clients"). APs are physical, electronic devices that enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network.

Further, organizations and network providers may use software-defined networking in a wide area network (SD-WAN) to manage network connectivity among distributed locations (e.g., sites), such as remote branch or central offices or data centers. SD-WAN extends SDN to enable businesses to create connections quickly and efficiently over the WAN, which may include the Internet or other transport networks that offer various WAN connection types, such as Multi-Protocol Label Switching (MPLS)-based connections, mobile network connections (e.g., 3G, Long-Term Evolution (LTE), 5G), Asymmetric Digital Subscriber Line (ADSL), and so forth. Such connections are typically referred to as "WAN links" or, more simply, as "links." SD-WAN is considered a connectivity solution that is implemented with WAN links as an overlay on top of traditional WAN access, making use of the above or other WAN connection types.

SUMMARY

In general, this disclosure describes techniques for detecting network events or network issues influencing a client device that adversely impact a user experience associated with the client device. A network analysis system can receive various forms of network data, including telemetry data, from network devices of a network, and from such network data, can identify one or more network events. In some examples, the network data includes network traffic impact data, such as a number of packets dropped at a switch port due to congestion. The network analysis system also receives user data indicating a user impact. Based on the network data and the user data, a network analysis system can correlate the events in time and detect a problem in the network. The network analysis system may be part of a network management system (NMS), for example.

The NMS correlates network events and/or trends determined from network data with the user impact data from client devices to identify network events that have a problematic user impact on client devices. The NMS can also identify a root cause of the problem, and initiate a remedial action to address the problem. In some examples, the root cause of the problem may be due to an offending client device, such as due to misconfiguration, misuse, or other issues.

The techniques disclosed herein may be included in a practical application that provides technical advantages over existing systems. For example, a network management system can periodically or on demand receive network data from network devices (e.g., switches, routers, gateways, APs etc.) The network management system can utilize the network data to perform a trending analysis. The network management system can determine that network is trending towards overwhelming network traffic having an adverse user impact. The network management system can determine, from the network data, a root cause for the overwhelming network traffic and an action to remediate the overwhelming network traffic. The network management system can send the action to a network device in the network or a client device to remediate overwhelming network traffic. Thus, the overwhelming network traffic can be automatically detected and remediated without requiring network administrators or other parties to be on-site. This can result in troubleshooting and remediating overwhelming network traffic in less time, resulting in greater network user and network operator satisfaction with the services provided by the network.

In one example, a method includes receiving, by processing circuitry of a network management system (NMS), network data from a plurality of network devices configured to provide a network at a site; receiving, by the processing circuitry, user impact data from a plurality of client devices that access the network at the site; determining, by the processing circuitry and based on the network data, a pattern of one or more network events occurring over time; correlating in time, by the processing circuitry, the pattern of the one or more network events to an adverse user impact event indicated by the user impact data received from the plurality of client devices; and determining, by the processing circuitry and in response to the correlating, an instance of overwhelming network traffic having an adverse user impact.

In another example, a method includes receiving, by processing circuitry of a network management system (NMS), network data from a plurality of network devices configured to provide a network at a site; receiving, by the processing circuitry, user impact data from a plurality of client devices that access the network at the site; determining, by the processing circuitry and based on the network data, a pattern of one or more network events occurring over time; correlating in time, by the processing circuitry, the pattern of the one or more network events to an adverse user impact event indicated by the user impact data received from the plurality of client devices; and determining, by the processing circuitry and in response to the correlating, an instance of overwhelming network traffic having an adverse user impact.

In another example, a computer-readable medium, having instructions stored thereon that, when executed, cause one or more processors of a network management system (NMS) to: receive network data from a plurality of network devices configured to provide a network at a site; receive user impact data from a plurality of client devices that access the network at the site; determine, based on the network data, a pattern of one or more network events occurring over time; correlate in time the pattern of the one or more network events to an adverse user impact event indicated by the user impact data received from the plurality of client devices; and determine, in response to the correlating, an instance of overwhelming network traffic having an adverse user impact.

The details of one or more examples are set forth in the accompanying drawings and the description below. Other features, objects, and advantages will be apparent from the description and drawings, and from the claims.

DETAILED DESCRIPTION

Figure 1:
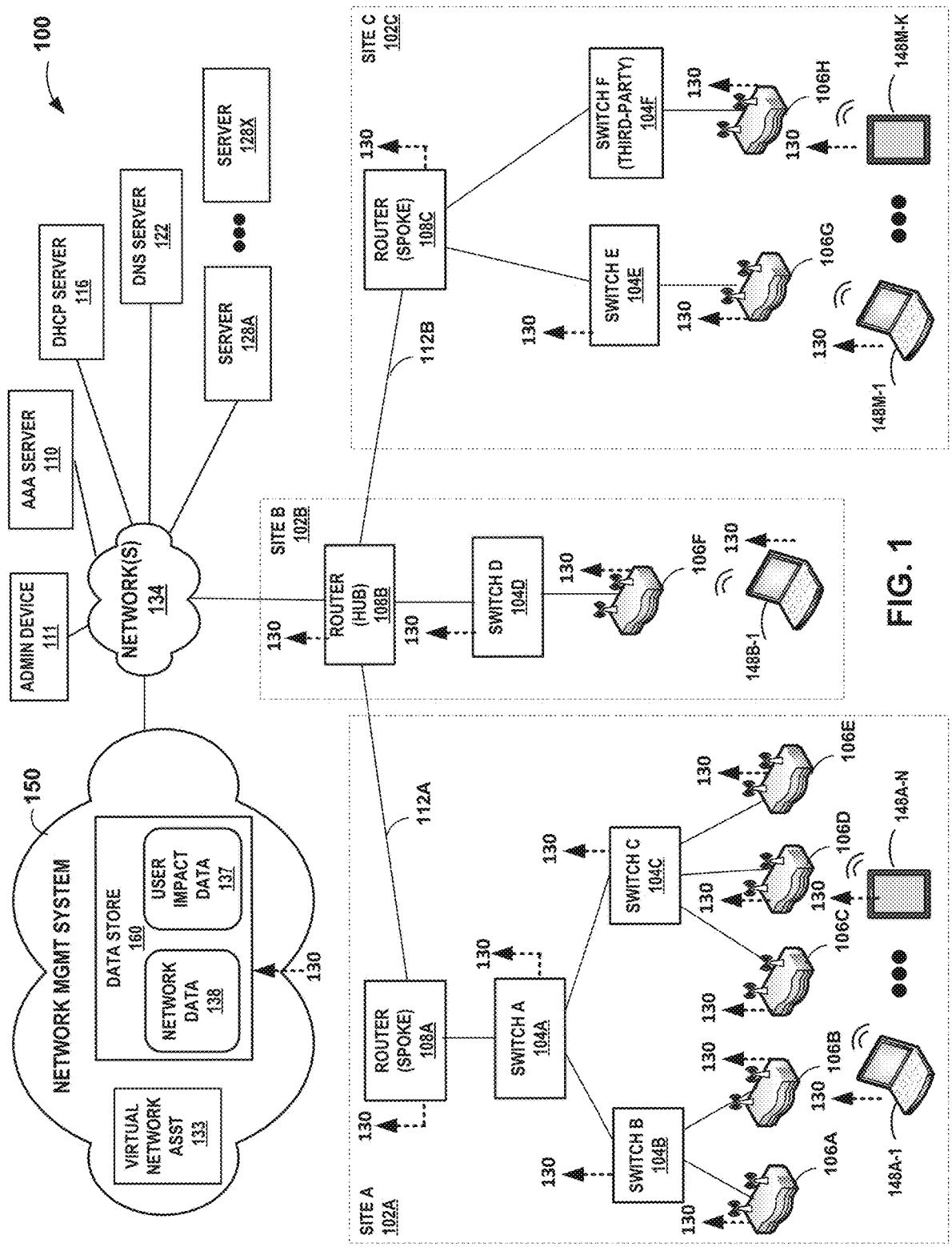
FIG. 1 is a block diagram of an example network system, in accordance with one or more techniques of the disclosure.

FIG. 1 is a block diagram of an example network system 100 in which a network management system (NMS) 150 automatically detects, troubleshoots, and remediates network events having a problematic user impact, according to one or more techniques of the disclosure. In the example shown in FIG. 1, an organization includes three sites 102A-102C arranged in a "hub and spoke" architecture, with site 102B being the hub site and sites 102A and 102C being spoke sites. As an example, the organization may be a large corporation with multiple campuses, where each campus may be a site. Generally speaking, a site may refer to a geographic location. The organization may have sites in different cities, sites that are different campuses within a city, sites that are different buildings within a campus, etc. In some examples, network topologies other than hub and spoke may be used. For example, the network may be a partial mesh topology, a full mesh topology, or other network topology. Further, the network topology may be a hybrid topology. For example, the hubs and sites may be arranged in a hub and spoke topology while internal to a site, the network may have a mesh topology.

Network system 100 also includes switches 104A-104F (collectively "switches 104") and access points (APs) 106A-106H. Each AP 106 may be any type of wireless access point, including, but not limited to, a commercial or organization AP, a wireless router, or any other device capable of providing wireless network access.

Site 102B includes router 108B which is configured as a hub router. Router 108B is configured to communicate with router 108A at site 102A via wide area network (WAN) link 112A, where router 108A is configured as a spoke router. Router 108B is configured to communicate with router 108C at site 102C via WAN link 112B, where router 108C is configured as a spoke router. Further, router 108B is configured to communicate with network 134. Router 108B is also configured to communicate with switch 104E, which is configured to communicate with AP 106F.

In addition to router 108A, site 102A includes switch 104A that is communicatively coupled to switches 104B and 104C. Switch 104B is communicatively coupled to APs 106A and 106B. Switch 104C is communicatively coupled to APs 106C-106E.

In addition to router 108C, site 102C includes switches 104E and 104F. Switch 104E is communicatively coupled to AP 106G and switch 104F is communicatively coupled to AP 106H.

Various client devices 148 may be communicatively coupled to the APs 106, as shown in FIG. 1. Client devices 148 may also be referred to as "user equipment devices" (UEs) and/or "user devices." For example, client devices 148A-1-148A-N ("client devices 148A") are currently located at site 102A. Client devices 148B-1 is currently located at site 102B. Similarly, a plurality of client devices 148N-1 through 148N-K are currently located at site 102N. A client device 148 of an access point may be any type of wireless client device, including, but not limited to, a mobile device such as a smart phone, tablet or laptop computer, a personal digital assistant (PDA), a wireless terminal, a smart watch, smart ring or other wearable device. A client device 148 may also be an IoT device such as a printer, security device, environmental sensor, or any other device configured to communicate over one or more wireless networks.

Example network system 100 also includes various networking components for providing networking services within the wired network including, as examples, an Authentication, Authorization and Accounting (AAA) server 110 for authenticating users and/or client devices, a Dynamic Host Configuration Protocol (DHCP) server 116 for dynamically assigning network addresses (e.g., IP addresses) to client devices upon authentication, a Domain Name System (DNS) server 122 for resolving domain names into network addresses, a plurality of servers 128 (e.g., web servers, databases servers, file servers and the like.

During operation, devices in network system 100 may collect and communicate telemetry data 130 to NMS 150. Telemetry data 130 may vary depending on the type of device providing the information and whether or not the device is configured to provide telemetry data. NMS 150 can store the received telemetry data 130, along with other data about network system 100, as network data 138. NMS 150 may obtain telemetry data 130 using a "push" model or a "pull" model. In a pull model, NMS 150 may poll network devices in network system 100 and request that the network devices send their respective telemetry data 130 to NMS 150. In a push model, the various network devices of network system 100 periodically send telemetry data 130 to NMS 150 without NMS 150 having to request telemetry data 130.

In some aspects, AP 106 may provide AP telemetry data that includes information regarding AP connectivity to other network devices. For example, the AP telemetry data may include data identifying the number of client devices 148 connected to the AP and a switch connected to the AP. In some aspects, an AP 106 may provide Link Layer Discovery Protocol (LLDP) data as part of telemetry data 130. Link Layer Discovery Protocol (LLDP) is a layer 2 neighbor discovery protocol that allows devices to advertise device information to their directly connected peers/neighbors. An AP 106 may provide LLDP data to identify a wired connection to a switch.

AP 106 may also report information on client devices 148 connected to the AP. In some aspects, NMS 150 may treat information about client devices received from an AP as a separate source from the AP, e.g., NMS 150 treats the client information as if it came from the client device rather than the AP device. Clients and client connectivity data have relatively high volume compared to other entities in the network. In some aspects, an AP may periodically report telemetry data to NMS 150 (e.g., every minute).

Similarly, a switch 104 may provide AP telemetry data regarding connectivity to an AP 106. Switches 104 may also provide switch telemetry data regarding connectivity to other switches, routers, gateways etc. In some aspects, switches 104 may provide LLDP data identifying the switch reporting the LLDP data and identifying devices connected to ports of the switch and the types of ports.

Other devices such as routers and gateways may also provide telemetry data such as LLDP data. Additionally, gateway devices (e.g., routers 108) may report both wired connections and virtual or logical connections. A given network device may establish multiple logical paths (e.g., peer paths or tunnels) over a WAN with multiple other network devices on a single physical interface. Each of the network devices may include a software agent or other module configured to report path data collected at a logical path level to NMS 150 in the cloud and/or the path data may be retrieved from the network devices by NMS 150 via an application programming interface (API) or protocol. In some aspects, the telemetry data may include labels identifying the network device as a hub or data center router. In some aspects, the telemetry data may identify the router as a spoke router (e.g., a branch office router).

In examples where routers 108 include session-based routers, a given session-based router may establish multiple peer paths over the WAN with multiple other session-based routers on a single physical interface. Each of the session-based routers may include a software agent imbedded in the session-based router configured to report the path data collected at a peer path level to the NMS in the cloud. In examples where the network devices comprise packet-based routers, a given packet-based router may establish multiple tunnels over the WAN with multiple other packet-based routers on a single physical interface. Each of the packet-based routers may collect data at a tunnel level, and the tunnel data may include the tunnel data as part of telemetry data 130 reported to NMS 150.

Routers 108 may also report network session data such as session flow data. Session flow data can include source and destination client IP addresses and session duration for a network session between two network devices.

In some examples, network devices 104, 108 employ a stateful, session-based routing scheme that enables each network devices 104, 108 to independently perform path selection and traffic engineering. In some examples, routers 108 are session aware SD-WAN routers. The use of session-based routing may enable network devices 104, 108 to eschew the use of a centralized controller, such as a Software-Defined Networking (SDN) controller to perform path selection and traffic engineering. In this way, network devices 104, 108 may be more efficient and scalable for large networks where the use of an SDN controller would be infeasible. Furthermore, the use of session-based routing may enable network devices 104, 108 to eschew the use of tunnels, thereby saving considerable network resources by obviating the need to perform encapsulation and decapsulation at tunnel endpoints. In some examples, network devices 104, 108 implement session-based routing as Secure Vector Routing (SVR).

As described herein, a network session (also referred to herein as a "session") includes a forward packet flow originating from a first device and destinated for a second device and/or a reverse packet flow originating from the second device and destined for the first device. The session may be bidirectional in that the session may include packets travelling in both directions (e.g., a forward packet flow and a reverse packet flow) between the first and second devices.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; and U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In the example of FIG. 1, network management system (NMS) 150 can receive telemetry data 130 and user impact data 137. In this example, NMS 150 can be a cloud-based computing platform that implements various techniques of the disclosure.

Virtual network assistant 133 may be a network analysis application, a network management application, a network reporting application, a network visualization application, a network troubleshooting application and the like.

In some implementations, some or all of routers 108, switches 104, and APs 106 may be from the same manufacturer, or may provide telemetry data 130 that conforms to a format or protocol that is known to NMS 150. However, it may be the case that some network devices in network system 100 do not provide telemetry data 130, or do not provide data according to format or protocol known to NMS 150. Such network devices may be referred to as third-party network devices. For instance, in the example illustrated in FIG. 1, switch 104F does not provide telemetry data 130 to NMS 150 and is thus a third-party network device. In such cases, NMS 150 can use techniques to infer the existence of devices like switch 104F that do not provide telemetry data 130. In the example of FIG. 1, AP 106H is connected to third-party switch 104F and does report telemetry data 130. Additionally, router 108C is connected to third-party switch 104F and reports telemetry data 130. NMS 150 may use telemetry data from router 108C and/or AP 106H to infer the existence of switch 104F and connection properties of switch 104F even though switch 104F itself may not report such information.

As shown in FIG. 1, the various devices and systems of network system 100 are coupled together via one or more network(s) 134, e.g., the Internet and/or an enterprise intranet. Each one of the servers 110, 116, 122, 128, switches 104, routers 108, APs 106, NMS 150, and any other servers or devices attached to or forming part of network system 100 may include a system log or an error log module wherein each one of these devices records the status of the device including normal operational status and error conditions.

In the example of FIG. 1, NMS 150 is a cloud-based computing platform that manages networks and network devices at one or more of sites 102A-102C. In accordance with one specific implementation, a computing device is part of NMS 150. In accordance with other implementations, NMS 150 may comprise one or more computing devices, dedicated servers, virtual machines, containers, services, or other forms of environments for performing the techniques described herein. Similarly, computational resources and components implementing VNA 133 may be part of the NMS 150, may execute on other servers or execution environments, or may be distributed to nodes within network 134 (e.g., routers, switches, controllers, gateways, and the like).

In some examples, telemetry data 130 may represent "overhead traffic" data. Overhead traffic data may include data that is not present in client application data. Telemetry data 130 may, in some examples, represent network climate data that is different from network data 138. Telemetry data 130 may, in some examples, indicate network activity that causes an adverse user impact. In some examples, telemetry data 130 may represent a category of data that is separate from network data 138. For example, telemetry data 130 may include information sent to NMS 150 specifically for the purpose of monitoring network system 100, whereas network data 138 includes network traffic sent for the purpose of operating network system 100. That is, NMS 150 may use telemetry data 130 for monitoring the network rather than configuring one or more devices within the network.

In some examples, NMS 150 may receive telemetry data 130 directly from one or more devices within network system 100. For example each client device of client devices 148 may output telemetry data directly to NMS 150, each AP of APs 106 may output telemetry data directly to NMS 150, each switch of switches 104 may output telemetry data directly to NMS 150, and each network device of routers 108 may output telemetry data directly to NMS 150. The telemetry data 130 received by NMS 150 may include telemetry data from any one or combination of devices of switches 104, APs 106, routers 108, and client devices 148.

In some examples, each device within switches 104, APs 106, routers 108, and client devices 148 may form a secure connection between the respective device and NMS 150. In some examples, each secure connection may include a socket (e.g., an HTTPS kernel). This may allow each device of switches 104, APs 106, routers 108, and client devices 148 may send telemetry data to NMS 150 in a manner that is secure.

In some examples, a client device of client devices 148 may communicate directly with NMS 150 when the client device downloads a software development kit (SDK). The SDK may enable the client device of client devices 148 to send telemetry data 130 and/or user impact data 137 directly to NMS 150, e.g., via an API, without sending the data via switches 104, APs 106, and/or routers 108.

In accordance with the techniques described herein, NMS 150 monitors network data 138 such as telemetry data 130 associated with networks and network devices at each site 102A-102C, respectively, and manages network resources, such as routers 108, switches 104, and/or APs 106 at each site, to deliver a high-quality networking experience to end users, IoT devices and clients at the site. The telemetry data received by NMS 150 may be stored in a data store 160 as network data 138. In some examples, NMS 150 may use network data 138 to determine a network topology. In addition, NMS 150 collects user impact data 137 from client devices 148. As described herein, NMS 150 correlates network events and/or trends determined from network data 138 from network devices with the user impact data 137 from client devices 148 to identify network events or trends that indicate overwhelming network traffic causing a problematic user impact on client devices 148.

In some examples, user impact data 137 may be obtained by NMS 150 from application servers separate from client devices 148. In one example, the user impact data 137 may indicate user rankings or user feedback of application session quality. User impact data 137 is not limited to user rankings and user feedback. In some examples, user impact data 137 may include data from one or more of client devices 148 that indicates one or more aspects of a connection between the respective client device and an AP of APs 106. 106. For example, user impact data 137 may include data indicating a network speed and/or data from one or more of client devices 148 that otherwise indicates a health of a connection between the client device and the network.

In some examples, NMS 150 may have some integration with third-party application/service performance monitoring (APM) vendors to retrieve insights data for application services and/or service providers via application programming interfaces (APIs) to determine whether the application services and/or service providers are down or experiencing issues. In some examples, NMS 150 may query a third-party APM vendor for insights data of service provider server 766. In some examples, application session troubleshooting engine 136/352 may perform an on-demand query of the third-party APM vendor for insights data of service provider server 766 in response to user input 760 requesting troubleshooting of the identified application session. In other examples, application session troubleshooting engine 136/352 may perform proactively query the third-party APM vendor for insights data of service provider server 766 to perform monitoring of service provider server 766. Based on the retrieved insights data, conversational assistant engine 136, 356 may generate the indicia of performance or connectivity health for the network devices involved with the identified application session, including the third-party network devices such as service provider server 766.

In some examples, network data 138 may include data indicating one or more instances where a network device drops packets. For example, if a client device of client devices 148 downloads a large amount of data via one or more network devices, a network device may drop one or more packets of the download. In some examples, a network device may drop a percentage (e.g., 25%) of the packets of the download to the client device. In some examples, the client device may be configured to complete the download even though some packets are dropped, but dropped packets can cause a download to take longer as compared with downloads where packets are not dropped. When network data 138 indicates that one or more network devices are dropping more than a threshold percentage of packets, NMS 150 may determine that the dropped packets represent one or more network events.

As one example, from network data 138 NMS 150 detects a high usage of client management traffic and/or network management traffic, relative to user application traffic. In some cases, client management traffic may be sent to initialize a client device, such as a mobile device or IoT device. In some examples, user application traffic represents network traffic corresponding to one or more of client devices 148 accessing services (e.g., services provided by servers 128) and/or network traffic corresponding to a client device of client devices 148 communicating with another client device of client devices 148. NMS 150 may collect and monitor network data 138 from each hop in the network that passes the user application traffic, and analyze together all of the data from each hop. By collecting and monitoring the data indicating a proportion of management traffic to user application traffic at each hop along a user application path, NMS 150 can use this information to help identify and flag for remediation a situation of overwhelming network traffic causing a problematic user impact on client devices 148.

In some examples, client management traffic may compete with user application traffic, such that client management traffic and user application traffic both flow through one or more network devices of network system 100. In some examples, NMS 150 may analyze user application traffic from each hop of one or more hops within network system 100 that passes user application traffic, such as devices that carry a specific application session. NMS 150 may generate a topology of the network devices and connections between the network devices that were involved in the particular application session over a duration of the particular application session Such an NMS is described in further detail in U.S. Patent No. 11,968,075, filed Sep. 27, 2022, issued Apr. 23, 2024, and entitled "APPLICATION SESSION-SPECIFIC NETWORK TOPOLOGY GENERATION FOR TROUBLESHOOTING THE APPLICATION SESSION," the entire contents of which are incorporated by reference herein. The application-session specific topology is built based on telemetry data received from the network devices, e.g., client devices, AP devices, switches, and other network nodes such as routers, over the duration of the particular application session.

In some examples, NMS 150 may analyze the proportion of user application traffic at each hop of the one or more hops along an application session path relative to the proportion of user application at each other hop (node) of the one or more hops. In some examples, to identify and flag a situation of overwhelming network traffic causing a problematic user impact on client devices 148, NMS 150 may determine that a node of the one or more nodes is handling a significantly greater proportion of the user application traffic than one or more other nodes of the one or more nodes. In some examples, to identify and flag a situation of overwhelming network traffic, NMS 150 may determine that a group of nodes connected within network system 100 is handling a significantly greater proportion of the user application traffic than one or more other groups of nodes. In any case, NMS 150 may analyze the amount of network traffic at one or more nodes and/or the proportion of network traffic handled by one or more nodes relative to the proportion of the network traffic handled by other nodes.

In some examples, NMS 150 may analyze user application traffic at each layer of one or more layers of network system 10. For example, NMS 150 may include one or more Layer 2 network devices and/or one or more Layer 3 network devices. NMS 150 may analyze a proportion of the user application traffic being handled by the one or more Layer 2 network devices and a proportion of the user application traffic being handled by the one or more Layer 3 network devices.

In general, NMS 150 may provide a cloud-based platform for network data acquisition, monitoring, activity logging, reporting, predictive analytics, network anomaly identification, invoking remedial actions, and alert generation. For example, NMS 150 may include a virtual network assistant (VNA) 133 that analyzes network data 138, provides real-time insights and simplified troubleshooting for IT operations, and automatically takes corrective action or provides recommendations to proactively address various wired and wireless network issues, including the presence of overwhelming network traffic having a problematic effect on user experience. VNA 133 may, for example, include a network data processing platform configured to process hundreds or thousands of concurrent streams of network data from sensors and/or agents associated various devices in network system 100 (e.g., routers 108, switches 104, and/or APs 106) and/or nodes within network 134. VNA 133 may provide real-time alerting and reporting to notify administrators of any predicted events, anomalies, trends, and may perform root cause analysis and automated or assisted error remediation.

In some examples, VNA 133 of NMS 150 may apply machine learning techniques to identify the root cause of overwhelming network traffic detected or predicted from the streams of event data. For example, in some aspects, VNA 133 may utilize a machine learning model that has been trained using either supervised or unsupervised machine learning techniques to identify the root cause of error conditions or overwhelming network traffic based on network data. VNA 133 may generate a notification indicative of the root cause and/or one or more corrective or remedial actions that may be taken to address the root cause of the overwhelming network traffic. If the root cause may be automatically resolved, VNA 133 can automatically invoke one or more corrective actions to correct the root cause of the overwhelming network traffic.

Example details of these and other operations implemented by the VNA 133 and/or NMS 150 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," U.S. application Ser. No. 16/296,902, filed Mar. 8, 2019, and entitled "Method for Conveying AP Error Codes Over BLE Advertisements," and U.S. application Ser. No. 17/303,222, filed May 24, 2021, and entitled, "Virtual Network Assistant Having Proactive Analytics and Correlation Engine Using Unsupervised ML Model," all of which are incorporated herein by reference in their respective entireties.

In operation, NMS 150 observes, collects and/or receives telemetry data 130 and stores the telemetry data 130 as part of network data 138. The network data is indicative of one or more aspects of wired or wireless network performance. Network data 138 may take the form of data extracted from messages, counters and statistics, for example. The network data may be collected and/or measured by one or more network devices (e.g., routers 108, switches 104, APs 106 etc.) in a wired or wireless network of a site 102. Some of the network data may be collected and/or measured by other devices in the network system 100. In accordance with one example implementation, a processor or computing device is part of the network management system 150. In accordance with other implementations, NMS 150 may comprise one or more processors, processing circuitry, computing devices, dedicated servers, virtual machines, containers, services or other forms of environments for performing the techniques described herein. Similarly, computational resources and components implementing VNA 133 may be part of the NMS 150, may execute on other servers or execution environments, or may be distributed to nodes within network system 100 (e.g., routers, switches, controllers, gateways, and the like).

NMS 150 can detect that a network is experiencing network events indicative of overwhelming network traffic, and can also detect when the overwhelming network traffic is causing a problematic or negative user impact on users of a client device. In response to detecting overwhelming network traffic with a corresponding bad user impact, NMS 150 can determine a root cause of the overwhelming network traffic. For example, NMS 150 can process network data 138 using a machine learning model trained to determine root causes of overwhelming network traffic based on network data 138.

Upon determining the root cause of overwhelming network traffic, NMS 150 can determine remedial actions to cause remediation of the overwhelming network traffic. For example, an offending network device to be reset such that it is no longer causing overwhelming network traffic in a network. In some aspects, NMS 150 can send instructions to perform the remedial actions to a neighbor network device of an offending network device. The neighbor network device can relay the instructions to perform remedial actions to address the offending device or devices causing the overwhelming network traffic. As one example, a network device may be misconfigured, resulting in a loop in the network that causes overwhelming amounts of system-generated traffic. Upon performing the remedial actions, a formerly misconfigured network device may become correctly configured, and the overwhelming network traffic will attenuate. As a result, a ratio of system-generated traffic to user application traffic may be restored to a balanced state within expected ranges.

Although the techniques of the present disclosure are described in this example as being performed by NMS 150, techniques described herein may be performed by any other computing device(s), system(s), and/or server(s), and that the disclosure is not limited in this respect. For example, one or more computing device(s) configured to execute the functionality of the techniques of the disclosure may reside in a dedicated server or be included in any other server (such as any of servers 128A-128N) in addition to or other than NMS 150, or may be distributed throughout network system 100, and may or may not form a part of NMS 150.

FIG. 1 has shown an example network system 100 having three sites 102. A network system may have fewer or more sites than those illustrated in FIG. 1. Additionally, sites may have a fewer or greater number network devices such as routers 108, switches 104 and APs 106 than those shown in FIG. 1.

In some examples, NMS 150 is configured to operate according to an artificial intelligence/machine-learning-based computing platform providing troubleshooting and automatic remediation of user-impacting network issues identified by NMS 150.

As one example, at some point during the operation of network system 100, a network event may occur, or network conditions may arise, that has an impact on the bandwidth available to client devices such that a user experience of the client device is adversely impacted. This situation can arise due to various causes in a network. For example, a traffic loop may form, such as due to misconfiguration of a client device or a router, switch, or AP. As another example, a plurality of client devices may be configured to send a large number of discovery messages to discover neighboring devices in a wireless network, and the large number of discovery messages from the multiple client devices may be amplified and overburden the network bandwidth, leaving little room for application data traffic. As another example, the client devices may be Internet of Things (IoT) devices.

In some examples, a client device such as a Chromebook performs an aggressive scan and broadcasting upon entering a network, that may involve a high volume of discovery messages per unit time. The high volume of discovery messages may not be necessary for the normal function of that device, in that a smaller number of discovery messages could be sent with similar effect. Having multiple devices operating this way can cascade the impact because one device can multiply and propagate broadcasted discovery messages from another device. This may occur in settings in which a relatively large number of this type of client device are present on the same wireless network, such as at a school where personal learning devices are in use by each student and teacher.

In some examples, the high volume of discovery messages per unit time may represent a pattern of one or more network events occurring over a period of time. Information indicative of a volume of discovery messages per unit time corresponding to a client device may be indicated by network data 138. In some examples, NMS 150 may determine, based on network data 138, a pattern of one or more network events that include the high volume of discovery messages per unit time. NMS 150 may correlate the high volume of discovery messages per unit time corresponding to the client device to an adverse user impact event indicated by user impact data 137. For example, user impact data 137 may include information indicative of an adverse user impact event at the same client device outputting the high volume of discovery messages per unit time. NMS 150 may determine the correlation between the high volume of discovery messages per unit time and the adverse user impact event.

Local area networks are often configured with redundant paths between different network segments to provide resilience to individual link failures and other potential network events. Such redundancy can introduce physical loops in the network topology. Moreover, loops can be introduced when a new network switch or other device is misconfigured or incorrectly connected when deployed to in the LAN.

Loops in a LAN can lead to significant consumption of bandwidth and network resources. In order to mitigate these effects, network switches typically communicate with each other according to a Spanning Tree Protocol (STP), which is an L2 protocol by which L2 switching devices agree to forwarding policies so as to prevent forwarding of traffic in certain directions or along certain paths in the event a loop exists in the underlying topology. However, in some instances, use of the STP may be insufficient to effectively and/or timely mitigate network degradation and other negative effects caused by presence of a physical loop.

In some examples, the NMS 150 and VNA 133 are configured to monitor network devices within a wired and/or wireless local area network having a set of wireless access points. As described, in some examples the VNA 133 applies machine learning-based models to network conditions and characteristics and user impact data to detect anomalies indicative of the presence of one or more loops in the network topology. Upon detecting a likelihood of one or more loops, the VNA may proactively alert an administrator and/or invoke remediation actions to mitigate the adverse effect of the loop(s) on network performance.

NMS 150 may determine a pattern of one or more network events that include one or more loops in the network. In some cases, by detecting the one or more loops in the network, NMS 150 may determine a pattern of one or more network events occurring over time. In other words, network data 138 may include information that NMS 150 analyzes to determine the one or more loops in the network. Additionally, or alternatively, user impact data 137 may include information that indicates a likelihood of one or more loops present in the network. This user impact data 137 may include user inputs indicating one or more adverse user impact events (e.g., poor network performance). NMS 150 may correlate the one or more loops detected in the network data 138 with the one or more adverse user impact events indicated by the user impact data 137. NMS 150 may determine an instance of overwhelming network traffic in response to correlating the one or more loops detected in the network data 138 with the one or more adverse user impact events indicated by the user impact data 137.

In general, the VNA operates according to phases. In a first phase of operation, the VNA monitors network traffic and characteristics as well as collected data indicative of user impact, and applies ML models to detect and correlate indicators indicative of the presence of a network loop. In a second phase of operation, the VNA performs root cause analysis and remediation of the detected loop.

With respect to the first phase, in some examples, the VNA may be configured to collect and analyze network data and detect the presence of network loops based on the following indicators: (1) Detected increased levels of "reflections" from devices in the system, such as wireless access points, where a "reflection" is an occurrence of an event where a network device receives an inbound network packet that the network device previously forwarded; (2) Detected increased levels of control plane traffic associated with the spanning tree protocol, where such increased levels are classified by the VNA as anomalous and may be indicative of a failure of the network switching devices to be able to resolve the presence of the physical loop using STP, and (3) Data indicative of user impact due to traffic looping, where such data is classified by the VNA as anomalous. An example is detecting an increased level or proportion of certain data plane traffic as compared to a VNA-predicted proportion, such as an unexpectedly high proportion of BUM traffic relative to unicast traffic, which may be indicative of traffic looping in the network. Because network traffic is typically BUM traffic whereas user traffic is typically unicast (in certain network implementations), BUM traffic consuming more bandwidth and leaving less available for user traffic than a VNA-predicted level may be indicative of traffic looping in the network.

As described below, the VNA may be AI-driven and configured to apply ML-based anomaly detection to detect and classify anomalous levels of the indicators, e.g., anomalous levels of reflections (#1 above), control plane traffic levels indicative of breakdown of the STP-based resolution of a network loop (#2 above), and/or anomalous data plane traffic patterns indicative of a user impact of the loop (#3 above).

As one example, the VNA may construct and maintain unsupervised ML models based on actual network event data collected for the network. For example, according to the techniques described herein, the VNA may automatically generate and retrain unsupervised ML models for proactive analytics and correlation based on network events extracted from historically observed messages and/or statistics for the network and/or other similar networks, including messages and data from the wireless access points and/or L2 wired switches within the LAN.

A proactive analytics and correlation engine may then apply the ML model(s) to data streams and/or logs of newly collected data of various network event types (e.g., statistics, messages, SLE metrics or the like, herein referred to as "PACE" event data or event type) to detect whether the currently observed network event data with the stream of incoming data is indicative of a normal operation of the system or whether the incoming network event data is indicative of a non-typical system behavior event or trend that requires mitigation. For example, the VNA determines a baseline for the normal network behavior.

In some examples, the VNA leverages its cloud-based connections and visibility into many different customer networks to use "global intelligence"-based learned data, in addition to learned local network data, to set the baseline values used to train the ML models. If only local network data is used for setting the baseline values, then the ML models could be faulty if there was a problem with how the network itself was configured, because the "normal" network behavior is actually abnormal. Including global intelligence in the baselining for the ML models may include using data from customer networks for customer(s) is in a similar industry, sector, and/or size to the local network for which the ML model is being trained. As an example, each retail store of a given company is different, but the different local client device behavior is relatively simple. For example, a proportion of user traffic (unicast) vs. network traffic (multicast) is likely to be similar across different retail stores, so a baseline proportion can be set for a given local network using data from other networks from other locations of the same company.

In addition, the VNA construct and maintain unsupervised ML models based on user impact data collected for the client devices. In some examples, user impact data may be different from network traffic impact data, because NMS 150 collects user impact data from client devices 148 and NMS 150 collects network traffic impact data from network devices (e.g., switches 104). If the VNA determines the currently observed network event data indicates a non-typical system behavior event or trend, the VNA also analyzes data indicative of a user impact of the non-typical system behavior. If the VNA only looks at the network event data, this may result in a false positive, where network event data is anomalous, but it does not impact the user experience and is thus of no concern and does not need mitigation. Anomalous network event data may have causes other than network loops, and some of these causes do not impact user experience. When a non-typical system behavior event or trend is detected along with a measurable user impact on the data packet forwarding path, then the VNA may determine a likely presence of a network loop. As such, based on the application of the models using the above example indicators, the VNA may determine the likely presence of a network loop.

Further, in a second phase of operation, the VNA may provide real-time alerting and reporting to notify administrators of any predicted events, anomalies, trends, and may perform root cause analysis and automated or assisted error remediation.

If the root cause of the network loop is determined with a high confidence level, the VNA may initiate error remediation. As one example, the identified root cause device may be shut down to remediate the network loop. If the root cause cannot be determined with a high level, in some examples the root cause analysis may involve troubleshooting actions such as shutting down each of a set of candidate root cause devices in turn, and observing the effect of each action on the network operation, and learning from the feedback. The feedback may be incorporated into the machine learning engine.

Whether the loop detection is for the wired or the wireless case depends on how the root cause device (the device causing the network loop) is connected to the network. Any of the wired devices or the wireless devices (e.g., IoT devices) can cause the loop. The wired case and the wireless case solutions may be different. The above example is in the case of a wired device causing the network loop.

In some examples, Wired Loop Detection looks for a system event called 'STP_Topology_Change', while Wireless Loop Detection looks for a different system event called "AP_Reflected". Except for that, most of other detection logics such as user impact, anonymous increase of system traffic inside LAN, etc, are applicable to both Wireless and Wired Loop Detection.

In the case that VNA 133 is able to determine a root cause of the overwhelming network traffic, VNA 133 may select an action to remediate the conditions causing the overwhelming network traffic based on the root cause of the overwhelming network traffic. There may be multiple actions that can remediate the overwhelming network traffic. In such cases, VNA 133 can select the action that has the least impact on (e.g., is the least disruptive to) the users of the network.

Figure 2:
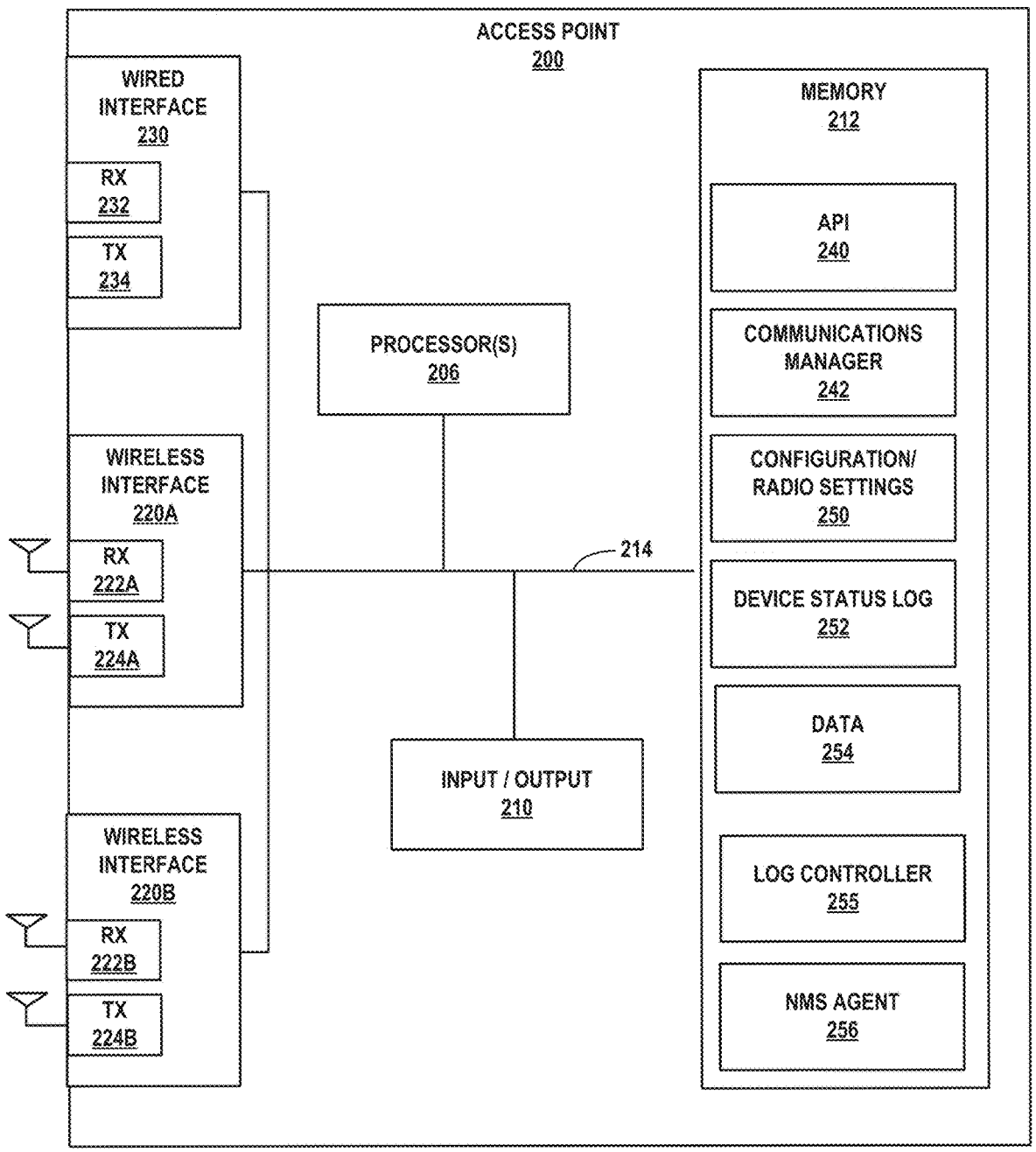
FIG. 2 is a block diagram of an example access point device, in accordance with one or more techniques of the disclosure.

FIG. 2 is a block diagram of an example AP 200 configured in accordance with one or more techniques of the disclosure. Example AP 200 shown in FIG. 2 may be used to implement any of APs 106 as shown and described herein with respect to FIG. 1. AP 200 may comprise, for example, a Wi-Fi, Bluetooth and/or Bluetooth Low Energy (BLE) base station or any other type of wireless access point.

In the example of FIG. 2, AP 200 includes a wired interface 230, wireless interfaces 220A-320B, one or more processor(s) 206, memory 212, and input/output (I/O) 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, AP 200 to network(s) 134 of FIG. 1.

First and second wireless interfaces 220A and 220B represent wireless network interfaces and include receivers 222A and 222B, respectively, each including a receive antenna via which AP 200 may receive wireless signals from wireless communications devices, such as laptop computers, smartphones, tablets, wearable devices, appliances, and Internet of Things (IoT) devices. First and second wireless interfaces 220A and 220B further include transmitters 224A and 224B, respectively, each including transmit antennas via which AP 200 may transmit wireless signals to wireless communications devices. In some aspects, first and second wireless interfaces 220A and 220B may communicate with wireless interfaces of other APs. In some examples, first wireless interface 220A may include a Wi-Fi 802.11 interface (e.g., 2.4 GHz and/or 5 GHz). Second wireless interface 220B may include a Bluetooth interface and/or a Bluetooth Low Energy (BLE) interface. However, these are given for example purposes only, and the disclosure is not limited in this respect. In some aspects, AP 200 may communicate with other access points using a Bluetooth and/or BLE interface.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform one or more of the techniques described herein.

Memory 212 includes one or more devices configured to store programming modules and/or data associated with operation of AP 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform one or more of the techniques described herein.

In this example, memory 212 stores executable software including an application programming interface (API) 240, a communications manager 242, configuration settings 250, a device status log 252 data 254, log controller 255, and NMS agent 256. Device status log 252 includes a list of network parameters and/or network events specific to AP 200. The network parameters may include, for example, any network parameter indicative of one or more aspects of performance of the wireless network. In some examples, network parameters may include a plurality of states measured periodically as time series data that can be translated into one or more SLE metrics. The network parameters may be measured by the client devices, the APs 106/200 or another device associated with the wireless network.

Network events may include, for example, access point events and/or client device events. The access point events and/or client device events may each include a log of normal network events, neutral network events, and/or error network events. The network events may include, for example, memory status, reboot events, crash events, Ethernet port status, upgrade failure events, firmware upgrade events, configuration changes, authentication events, DNS events, DHCP events, roaming events, etc., as well as a time and date stamp for each event. Log controller 255 determines a logging level for the device based on instructions from NMS 150. Data 254 may store any data used and/or generated by AP 200, including data collected from client devices of AP 200, such as data used to calculate one or more SLE metrics, that is transmitted by AP 200 for cloud-based management of wireless networks by NMS 150.

Communications manager 242 includes program code that, when executed by processor(s) 206, allow AP 200 to communicate with client devices and/or network(s) 134 via any of interface(s) 230 and/or 220A-220B. Configuration settings 250 include any device settings for AP 200 such as radio settings for each of wireless interface(s) 220A-220B. These settings may be configured manually or may be remotely monitored and managed by NMS 150 to optimize wireless network performance in real-time, or on a periodic (e.g., hourly or daily) basis.

I/O 210 represents physical hardware components that enable interaction with a user, such as buttons, a touchscreen, a display and the like. Although not shown, memory 212 typically stores executable software for controlling a user interface with respect to input received via I/O 210.

As described herein, AP 200 may measure and report network data (i.e., network parameters and/or network event data) from status log 252 to NMS 150. The network data is indicative of one or more aspects of wireless network performance and/or status of the wireless network. The network data may be measured and/or determined by one or more of the client devices of an AP 200 and/or by one or more of the APs 200 in a wireless network. AP 200 can provide the network data to NMS 150 for use in the techniques described herein.

In some examples, NMS agent 256 may periodically create a package of the statistical data according to a second periodic interval, e.g., every ninety seconds. In some examples, the package of statistical data may also include details about clients connected to network AP 200. NMS agent 256 may then report the package of statistical data to NMS 150 in the cloud. In other examples, NMS 150 may request, retrieve, or otherwise receive the package of statistical data from AP 200 via an API, an open configuration protocol, or another of communication protocols. The package of statistical data created by NMS agent 256 or another module of AP 200 may include a header identifying AP 200 and the statistics and data samples. In still other examples, NMS agent 256 reports event data to NMS 150 in the cloud in response to the occurrence of certain events at AP 200 as the events happen.

NMS agent 256 may receive data from NMS 150 that includes instructions for a neighboring network device to perform an action to remediate a situation resulting in overwhelming network traffic. For example, the neighboring device may have been misconfigured. NMS agent 256 can receive the data, which may include labels or a header indicating which neighboring network device of AP 200 is to receive the instructions. NMS agent 256 can send the instruction to a corresponding NMS agent of the neighboring network device, which can then perform the action or actions indicated in the instructions to remediate the misconfiguration.

In some aspects NMS agent 256 may receive, from NMS 150, the instructions for the neighboring network device via a first interface, and communicate the instructions to the NMS agent of the neighboring device via a second interface. As an example, NMS agent 256 may receive the instructions from NMS 150 via a wired interface and may send the instructions to the neighboring device via a wireless interface, such as a Bluetooth or BLE interface of AP 200. In some aspects, NMS agent 256 may provide the instructions to the neighboring device using a secure shell (SSH) protocol. In some aspects, NMS agent 256 may provide the instructions to the neighboring network device using LLDP.

Figure 3:
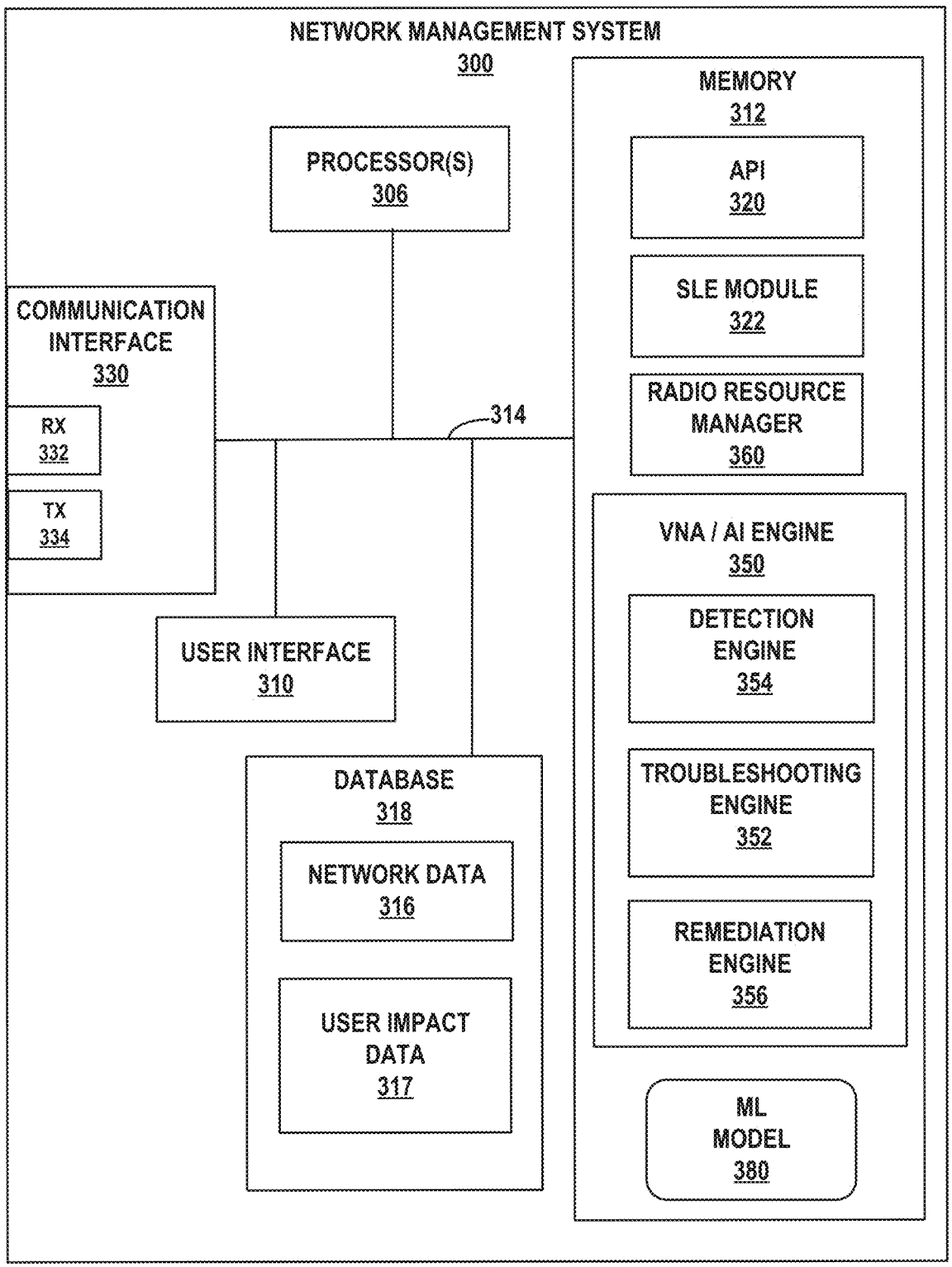
FIG. 3 is a block diagram of an example network management system, in accordance with one or more techniques of the disclosure.

FIG. 3 is a block diagram of an example network management system (NMS) 300 configured to operate in accordance with one or more techniques of the disclosure. NMS 300 may be used to implement, for example, NMS 150 in FIG. 1. In such examples, NMS 300 is responsible for monitoring and management of one or more networks at sites 102A-102C, respectively.

NMS 300 includes a communications interface 330, one or more processor(s) 306, a user interface 310, a memory 312, and a database 318. The various elements are coupled together via a bus 314 over which the various elements may exchange data and information. In some examples, NMS 300 receives data from one or more of APs 106 (and their client devices 148), switches 104, routers 108 and other network nodes sites of 102A-102C of FIG. 1, which may be used to determine network connectivity, to calculate one or more SLE metrics and/or update network topology. NMS 300 analyzes this data for cloud-based management of the wired and wireless networks of sites 102A-102C. The received data, including telemetry data 130, is stored as network data 316 in database 318. In some examples, NMS 300 may be part of another server shown in FIG. 1 or a part of any other server.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1, and/or any local area networks. Communications interface 330 includes a receiver 332 and a transmitter 334 by which NMS 300 receives/transmits data and information to/from any of APs 106, switches 104. Routers 108, servers 110, 116, 122, 128 and/or any other network nodes, devices, or systems forming part of network system 100 such as shown in FIG. 1. In some scenarios described herein in which network system 100 includes "third-party" network devices that are owned and/or associated with different entities than NMS 300, NMS 300 does not receive, collect, or otherwise have access to network data from the third-party network devices.

The data and information received by NMS 300 may include, for example, telemetry data 130 (FIG. 1), SLE-related data, or event data received from one or more of APs 106, switches 104, routers 108, or other network nodes used by NMS 300 to remotely monitor the performance of wired and wireless networks at sites 102A-102C. NMS 300 may further transmit data via communications interface 330 to any of network devices such as APs 106, switches 104, routers 108, other network nodes within the wired and wireless networks at sites 102A-102C, and/or admin device 111 to remotely manage the wired and wireless networks.

Memory 312 includes one or more devices configured to store programming modules and/or data associated with operation of NMS 300. For example, memory 312 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In the example shown in FIG. 3, memory 312 includes an API 320, an SLE module 322, a virtual network assistant (VNA)/AI engine 350, and a radio resource management (RRM) engine 360. In accordance with the disclosed techniques, VNA/AI engine 350 includes detection engine 354 that detects the presence of overwhelming network traffic causing an adverse user impact in the wired and/or wireless networks of sites 102A-102C, as described herein.

In some examples, network data 316 defines a series of network events of one or more event types over many observation time periods. VNA/AI engine 350 can apply a machine learning model such as ML model 380 to the network data to dynamically determine a baseline number of occurrences of the network events in the network for each of the event types over a time period and to classify, based on the baseline number of occurrences and subsequently received network data, the one or more network events as an abnormal network event indicative of abnormal network behavior.

In some cases, VNA/AI engine 350 performs a time series trending analysis of the stored data. This may be useful to detect a gradual increase in network traffic, and to identify a starting point of the gradual increase. In contrast to a spike in network traffic, such as due to a network outage or disaster, which is easy to detect and identify a time, some scenarios of overwhelming network traffic may be such that it is a gradual buildup over time. VNA/AI engine 350 may detect a source of the data, i.e., which device is generating traffic that resulted in the gradual increase.

In some examples, VNA/AI engine 350 uses ML model 380 in applying trending analysis to identify trending behavior in network events over a time period to classify, based on the predicted counts and subsequently received network data, one or more network events as indicative of abnormal network behavior. In some examples, VNA/AI engine 350 applies trending analysis to identify trending behavior by performing time series pattern recognition to identify a start of the trending behavior. In some examples, VNA/AI engine 350 uses transferred learning information from a different network to dynamically determine a baseline number of occurrences of the network events, the transferred learning information including information about a number of occurrences of network events of one or more event types in the second network.

In accordance with the disclosed techniques, VNA/AI engine 350 includes troubleshooting engine 352 that determines root causes of overwhelming network traffic causing an adverse user impact in the wired and wireless networks of sites 102A-102C. Troubleshooting engine 352, in some examples, applies a ML model 380 to network data 316 and/or user impact data 317 to perform troubleshooting of overwhelming network traffic causing an adverse user impact by identifying root causes of the overwhelming network traffic at one or more of the network devices at sites 102A-102C. NMS 300 may also include any other programmed modules, software engines and/or interfaces configured for remote monitoring and management of wired and wireless networks of sites 102A-102C, including remote monitoring and management of any of APs 106/200, switches 104, routers 108, or other network devices.

SLE module 322 enables set up and tracking of thresholds for SLE metrics for each wired and wireless networks at sites 102A-102C. SLE module 322 further analyzes SLE-related data collected by network devices, such as any of APs 106, switches 104, and routers 108. SLE module 322 may further analyze data from client devices in each wireless network of sites 102A-102C. This data is transmitted to NMS 300, which executes by SLE module 322 to determine one or more SLE metrics for APs 106, switches 104, and routers 108. This SLE data can be stored as, for example, network data 316 in database 318.

RRM engine 360 monitors one or more metrics for each site 102A-102N to learn and optimize the RF environment at each site. For example, RRM engine 360 may monitor the coverage and capacity SLE metrics for a wireless network at a site 102 to identify potential issues with SLE coverage and/or capacity in the wireless network and to make adjustments to the radio settings of the access points at each site to address the identified issues. For example, RRM engine may determine channel and transmit power distribution across all APs 106 in each wireless network at sites 102A-102C. For example, RRM engine 360 may monitor events, power, channel, bandwidth, and number of clients connected to each AP 106. RRM engine 360 may further automatically change or update configurations of one or more APs 106 at a site 102 with an aim to improve the coverage and capacity SLE metrics and thus to provide an improved wireless experience for the user.

VNA/AI engine 350 analyzes data received from network devices as well as its own data to identify the presence of network traffic that has an overwhelming effect on the network, and when corresponding undesired to abnormal states are encountered at one of the client devices, that also negatively impacts a user experience. In some aspects, NMS 150 detects overwhelming network traffic based on a ratio of system-generated traffic to application data traffic that is different than an expected baseline ratio (e.g., system-generated traffic is using too much bandwidth, leaving little for the application data traffic). In some aspects, NMS 150 may detect a negative user experience in response to a user report received by one of the client devices, or received from an application server, such as a poor rating of application quality experienced by the user in response to a user feedback prompt presented by an application. In some aspects, NMS 150 invokes VNA/AI engine 350 upon detection of overwhelming network traffic that negatively impacts client devices 148 and user experience. In some aspects, a network device periodically reports telemetry data 130 and other network data to NMS 150 at a predetermined interval.

VNA/AI engine 350 may identify the root cause of the overwhelming network traffic. In addition, VNA/AI engine 350 may automatically invoke one or more corrective actions intended to address the identified root cause(s) of the overwhelming network traffic. Examples of corrective actions that may be automatically invoked by VNA/AI engine 350 may include, but are not limited to, invoking RRM 360 to reboot one or more APs, adjusting/modifying the transmit power of a specific radio in a specific AP, adding SSID configuration to a specific AP, changing channels on an AP or a set of APs, etc. The corrective actions may further include restarting a switch and/or a router, invoking downloading of new software to an AP, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel, e.g., a site or network administrator using admin device 111, to address the network error.

VNA/AI engine 350 determine, based on the network data, a pattern of one or more network events occurring over time; correlate in time the pattern of the one or more network events to an adverse user impact event indicated by the user impact data received from the plurality of client devices; and determine, in response to the correlation, an instance of overwhelming network traffic having an adverse user impact.

In some examples, to determine the pattern, VNA/AI engine 350 may analyze the one or more network events occurring over time and determine a trend of the one or more network events occurring over time. In some examples, the trend of the one or more network events indicates that a performance of the network is worsening over time. In some examples, the trend of the one or more network events indicates that a performance of the network is improving over time. In some examples, the trend of the one or more network events indicates that a performance of the network is remaining steady over time. VNA/AI engine 350 may use available data, such as network data, to determine the trend. The network data may indicate one or more characteristics of network traffic at one or more network devices. For example, the network data may include network traffic impact data, which indicates an impact of network traffic at the network device. The network traffic impact data may indicate a number of packets dropped by a network device, or a percentage of packets dropped by a network device. When a number of packets dropped by a network device increases, VNA/AI engine 350 may identify a trend in one or more network events indicating a worsening network. When a number of packets dropped by a network device decreases, VNA/AI engine 350 may identify a trend in one or more network events indicating an improving network.

In some examples, to determine the pattern of the one or more network events, the VNA/AI engine 350 may determine the pattern over time in a time window, wherein the time window advances with respect to time. For example, VNA/AI engine 350 may determine the pattern of one or more network events within a time window preceding a present time, and as the present time advances, VNA/AI engine 350 may update the pattern to include one or more network events that occur as time advances, and exclude from the pattern one or more network events that fall outside of the time window as time advances. In other words, the time window may represent a rolling time window that represents a constant amount of time (e.g., one minute, one hour, or any other constant amount of time), but advances with the present time. This means that if the network worsens or improves over time, VNA/AI engine 350 may continuously monitor the health of the network by analyzing the one or more network events within the rolling time window.

In some examples, to correlate in time the pattern of the one or more network events to an adverse user impact event, VNA/AI engine 350 may identify a connection between a pattern of the one or more network events and an adverse user impact event indicated by the user impact data. For example, VNA/AI engine 350 may execute one or more models (e.g., machine learning models) using the network data and the user impact data as inputs. The VNA/AI engine 350 may determine that an adverse user impact event is associated with a trend in one or more network events that indicates a worsening network condition. Based on determining this correlation, VNA/AI engine 350 may determine an instance of overwhelming network traffic having an adverse user impact.

In some examples, VNA/AI engine 350 obtains data indicative of feedback responses from a client device application feedback prompt presented to a user by an application via a client device user interface. For example, VNA/AI engine 350 may obtain the data from an Application Programming Interface (API) for the application, which may be a cloud-based services application. The prompt may include one or more questions to a user, the one or more questions asking the user to identify a perceived health of the connection between the client device and the network. The client device may receive data indicative of a user's responses to the one or more questions, and VNA/AI engine 350 may obtain data indicative of a user's responses.

The network data may, in some examples, indicate operational behavior of the network. The operational behavior of the network may represent one or more actions or inactions that network devices make in forwarding network traffic through the network. For example, the operational behavior of the network may include an extent to which one or more network devices drop packets. The operational behavior of the network may include an extent to which the network delivers one or more services to client devices.

In some examples, VNA/AI engine 350 performs time series analysis and pattern detection to identify an instance of overwhelming network traffic. VNA/AI engine 350 may apply a machine learning model to the network data to dynamically determine a baseline number of occurrences of the network events in the network for each of the event types over a time period and to classify, based on the baseline number of occurrences and subsequently received network data, the one or more network events as an abnormal network event indicative of abnormal network behavior. In some examples, VNA/AI engine 350 may identify fewer than the baseline number of network events and determine that the fewer than the baseline number of occurrences indicate normal network behavior.

In some examples, VNA/AI engine 350 may train the machine learning model based on a set of training data. In some examples, the training data may include one or more sets of network training data and one or more sets of user impact training data. Once the machine learning model is trained, VNA/AI engine 350 may apply the machine learning model to network data and user impact data in order to dynamically determine a baseline number of occurrences.

Troubleshooting engine 352 may further enable troubleshooting network devices at sites 102A-102C by identifying overwhelming network traffic at one or more network devices at the sites. For example, application session troubleshooting engine 352 analyzes network data 316 of the network devices to identify root causes of the overwhelming network traffic with the network devices. More specifically, troubleshooting engine 352 may analyze network data 316 to determine whether overwhelming network traffic is present. In some scenarios, troubleshooting engine 352 may apply at least a portion of network data 316 to ML model 380 to determine root causes of the overwhelming network traffic.

In some examples, ML model 380 may comprise a ML model that is trained using supervised or unsupervised machine learning techniques applied to training data comprising pre-collected, labeled network data received from network devices (e.g., client devices, APs, switches and/or other network nodes), to identify root causes of overwhelming network traffic at network devices. ML model 380 may comprise one of a neural network, logistical regression, naïve Bayesian, support vector machine (SVM), or the like.

In the case of overwhelming network traffic being detected at a network device that negatively impacts a user experience, remediation engine 356 selects an action to remediate the overwhelming network traffic. In some aspects, the action may be commands or instructions to be performed by a misconfigured network device or a network neighbor device that are intended to restore proper configuration of the misconfigured network device. In some examples, VNA/AI engine 350 may determine a remedial action based on the detected overwhelming network traffic issue and/or a root cause determined for the detected overwhelming network traffic issue.

As noted above, there may be multiple actions that can remediate the overwhelming network traffic. In such cases, VNA 133 can select the action that has the least impact on (e.g., is the least disruptive to) the users of the network. For example, in the case of an access point, it is often less disruptive to reset a radio of the access point rather than resetting or rebooting the access point. Thus, VNA 133 may select resetting a radio on an access point when the root cause of the overwhelming network traffic is the radio. In some aspects, the remedial actions may be arranged as a hierarchy of actions according to impact on the user. If remediation engine 356 determines that a first remedial action was not effective in restoring the network balance, remediation engine 356 can select the next remedial action in the hierarchy.

Remediation engine 356 can include the instructions, commands, data etc. in an information or data packet that is sent to the network device. The information or data packet can include a header or labels that identify, to the neighbor network device, the target network device that is to receive the action and associate instructions, commands and/or data.

In some aspects, the remedial action may include automatically generating a return materials authorization (RMA) and sending the RMA to an operator of a site instructing the operator to return the misconfigured network device to the vendor of the device for further diagnosis and service. VNA/AI engine 350 may output the RMA and a notification of the overwhelming network traffic issue and/or the root cause of the overwhelming network traffic issue for display on admin device 111 (FIG. 1) of the administrator. In some examples, VNA/AI engine 350 may generate data representative of a user interface for presentation on an administrator device, such as admin device 111, and may output, for display, the data representative of the user interface. The generated data representative of the user interface may include data representative of a visualization of a network topology and devices impacted by the overwhelming network traffic issue and/or the determined likely root cause of the overwhelming network traffic issue, such as using color-coding, icons, or other indicia of the overwhelming network traffic issue within the network topology. In some examples, The generated data representative of the user interface may include data indicative of a suggested remediation action to address the overwhelming network traffic having the adverse user impact, such as by text, icons, graphical images, or other indicia. The generated data representative of the user interface may include data indicative of an applied remediation action to address the overwhelming network traffic having the adverse user impact, without requesting approval or input from an administrator.

Although the techniques of the present disclosure are described in this example as performed by NMS 300, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 300, or may be distributed throughout network system 100, and may or may not form a part of NMS 300.

Figure 4:
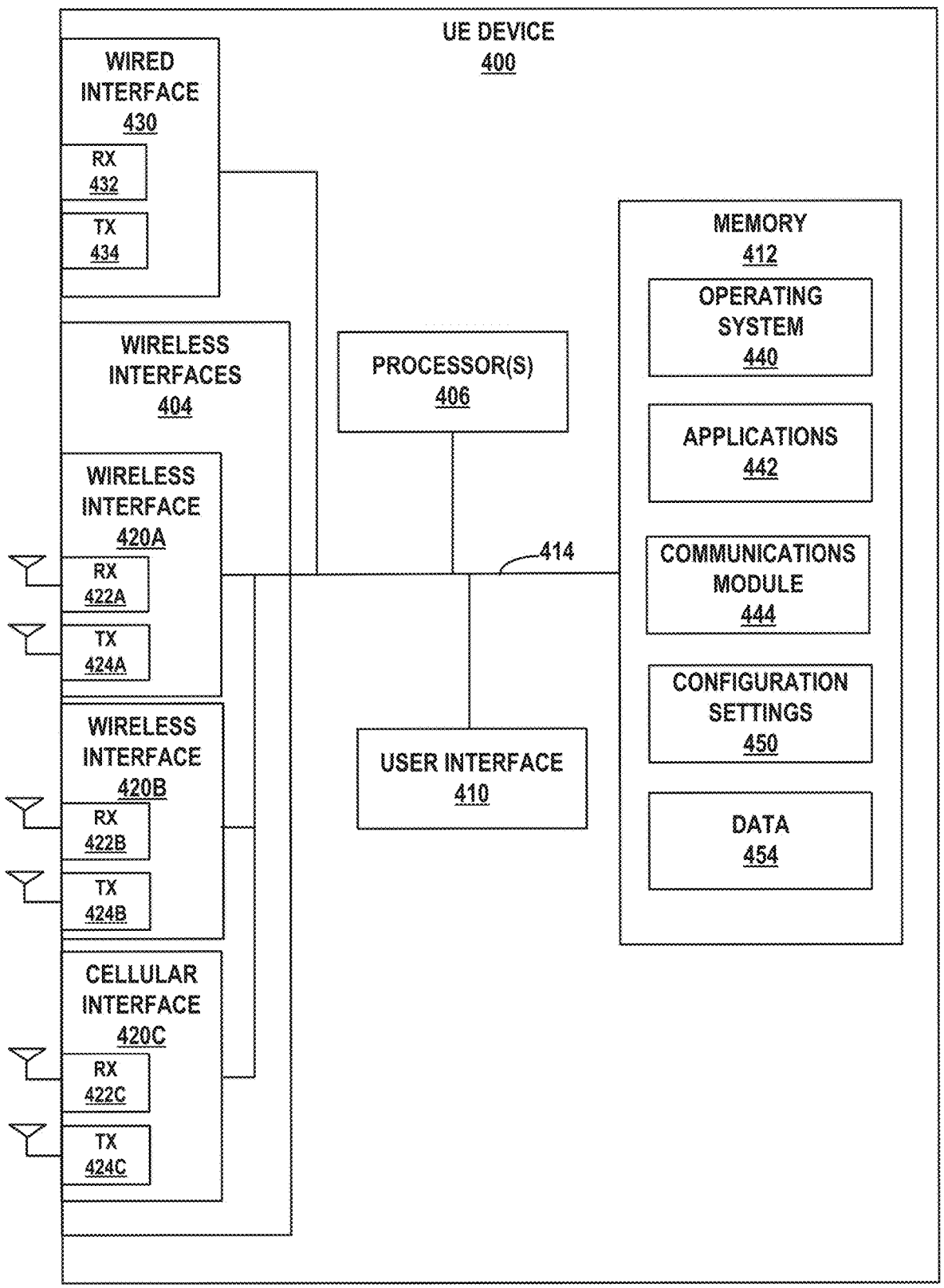
FIG. 4 is a block diagram of an example user equipment device in accordance with one or more techniques of the disclosure.

FIG. 4 shows an example client device 400. Example client device 400 shown in FIG. 4 may be used to implement any of client devices 148 as shown and described herein with respect to FIG. 1. Client device 400 may include any type of wireless client device, and the disclosure is not limited in this respect. For example, client device 400 may include a mobile device such as a smart phone, tablet or laptop computer, a personal digital assistant (PDA), a wireless terminal, a smart watch, a smart ring or any other type of mobile or wearable device. Client device 400 may also include any type of IoT client device such as a printer, a security sensor or device, an environmental sensor, or any other connected device configured to communicate over one or more wireless networks. In some examples, the client device 400 may be referred to as a "user device" and/or a user equipment (UE) device.

In accordance with one or more techniques of the disclosure, network data (e.g., client identifier, AP identifier, RSSI measurements) may be stored in client device memory 412 as network data 454 and transmitted to NMS 150/300 via one or more AP devices 142 in the wireless network. For example, NMS 150 receives network data from client devices 148 in networks 106A-106N of FIG. 1. In some examples, NMS 150 receives relevant network data from client devices 148 on a continuous basis (e.g., every 2 seconds or other appropriate time period), and NMS may determine proximity of each client device relevant to a proximity zone of an AP device to determine dwell time.

The network data 454 may include, for example, RSSI measurements of one or more wireless signals received from one or more AP devices by client device 400 as measured by the AP devices. The network data may further include a log of STP messages, a log of broadcast discovery or registration messages, or other data. The network data may include one or more feedback responses from a client device application feedback prompt presented to a user by an application via a client device user interface.

Client device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 includes a receiver 432 and a transmitter 434. Wired interface 430 may be used, if desired, to couple client device 400 to network(s) 134 of FIG. 1. Interfaces 420A, 420B, and 420C include receivers 422A, 422B, and 422C, respectively, each including a receive antenna via which client device 400 may receive wireless signals from wireless communications devices, such as AP devices 142 of FIG. 1, AP 200 of FIG. 2, other client devices 148, or other devices configured for wireless communication. Interfaces 420A, 420B, and 420C further include transmitters 424A, 424B, and 424C, respectively, each including transmit antennas via which client device 400 may transmit wireless signals to wireless communications devices, such as AP devices 142 of FIG. 1, AP 200 of FIG. 2, other client devices 148 and/or other devices configured for wireless communication. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy interface. Cellular interface 420C may include, for example, a cellular interface through which client device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of client device 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 includes an operating system 440, applications 442, a communications module 444, configuration settings 450, and data storage for network data 454. Data storage for network data 454 may include, for example, a status/error log including network data specific to client device 400. As described above, network data 454 may include any network data, events, and/or states that may be related to determination of one or more roaming quality assessments. The network data may include event data such as a log of normal events and error events according to a logging level based on instructions from the network management system (e.g., NMS 150/300). Data storage for network data 454 may store any data used and/or generated by client device 400, such as network data and user impact data, that is collected by client device 400 and transmitted to any of AP s 106 in a wireless network for further transmission to NMS 150. In some examples, the client device 400 reports user impact data to the NMS 150, such as via APs 106 or via APIs. In some examples, client device 400 includes an NMS agent (not shown) that communicates with NMS 150 using APIs. In some examples, the user impact data associated with client devices is obtained by NMS 150 from application servers separate from client devices 400. For example, the user impact data may indicate user rankings or user feedback of application session quality.

Communications module 444 includes program code that, when executed by processor(s) 406, enables client device 400 to communicate using any of wired interface(s) 430, wireless interfaces 420A-420B and/or cellular interface 450C. Configuration settings 450 include any device settings for client device 400 settings for each of wireless interface (s) 420A-420B and/or cellular interface 420C.

Figure 5:
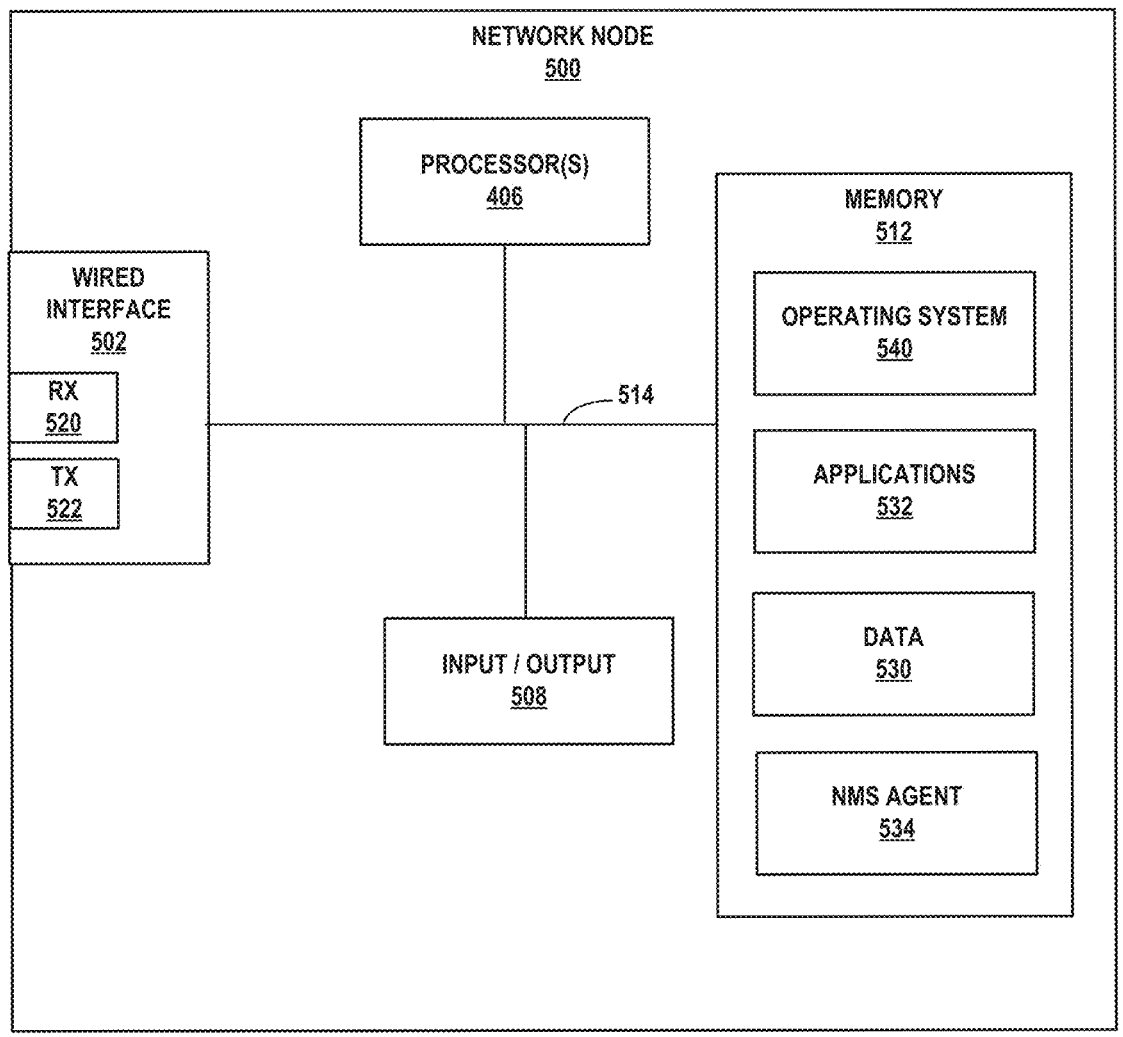
FIG. 5 is a block diagram of an example network node, such as a router, switch or server, in accordance with one or more techniques of the disclosure.

FIG. 5 is a block diagram illustrating an example network node 500 configured according to the techniques described herein. In one or more examples, the network node 500 implements a device or a server attached to the network 134 of FIG. 1, e.g., router, switch, AAA server 110, DHCP server 116, DNS server 122, VNA 133, Web server 128A-128X, etc., or a network device such as, e.g., routers, switches or the like. In some embodiments, client device 400 of FIG. 4 is server 110, 116, 122, 128, of FIG. 1 or a routers 108 or switches 104 of FIG. 1.

In this example, network node 500 includes a communications interface 502, e.g., an Ethernet interface, a processor 506, input/output 508, e.g., display, buttons, keyboard, keypad, touch screen, mouse, etc., a memory 512 and an assembly of components 516, e.g., assembly of hardware module, e.g., assembly of circuits, coupled together via a bus 514 over which the various elements may interchange data and information. Communications interface 502 couples the network node 500 to a network, such as an enterprise network.

Though only one interface is shown by way of example, network nodes may have multiple communication interfaces. Communications interface 502 includes a receiver 520 via which the network node 500 can receive data and information. Communications interface 502 includes a transmitter 522, via which the network node 500 can send data and information (e.g., including configuration information, authentication information, web page data, etc.).

In examples where network node 500 comprises a server, network node 500 may receive data and information, e.g., including operation related information, e.g., registration request, AAA services, DHCP requests, Simple Notification Service (SNS) look-ups, and Web page requests via receiver 520, and send data and information, e.g., including configuration information, authentication information, web page data, etc. via transmitter 522.

In examples where network node 500 comprises a wired network device, network node 500 may be connected via wired interface 502 to one or more APs or other wired client-side devices, e.g., switches, routers and/or IoT devices, within a wired network edge. For example, network node 500 may include multiple wired interfaces 502 and/or wired interface 502 may include multiple physical ports to connect to multiple APs or the other devices within a site via respective Ethernet cables. In some examples, each of the APs or other wired devices connected to network node 500 may access the wired network via wired interface 502 of network node 500. In some examples, one or more of the APs or other wired devices connected to network node 500 may each draw power from network node 500 via the respective Ethernet cable and a Power over Ethernet (PoE) port of wired interface 502.

Memory 512 stores executable software applications 532, operating system 540 and data/information 530. Data 530 includes system log and/or error log that stores network data and/or proximity information for node 500 and/or other devices, such as wireless access points, based on a logging level according to instructions from the network management system. In some examples, network data included in data 530 also may include network traffic impact data from network devices, for example, the packets dropped at certain switch ports due to congestion. Network node 500 may, in some examples, forward the network data to a network management system (e.g., NMS 150 of FIG. 1) for analysis as described herein.

The data collected and reported by network node 500 may include periodically-reported data and event-driven data. In some examples, network node 500 is configured to collect statistics and/or sample other data according to a first periodic interval, e.g., every 3 seconds, every 4 seconds, etc. Network node 500 may store the collected and sampled data, e.g., in a buffer. In some examples, NMS agent 534 may periodically create a package of the statistical data according to a second periodic interval, e.g., every 3 minutes. In some examples, the package of statistical data may also include details about clients connected to network node 500. NMS agent 534 may then report the package of statistical data to NMS 150 in the cloud. In other examples, NMS 150 may request, retrieve, or otherwise receive the package of statistical data from network node 500 via an API, an open configuration protocol, or another of communication protocols. The package of statistical data created by NMS agent 534 or another module of network node 500 may include a header identifying network node 500 and the statistics and data samples for each of the logical paths from network node 500. In still other examples, NMS agent 534 reports event data to NMS 150 in the cloud in response to the occurrence of certain events at network node 500 as the events happen.

Figure 6:
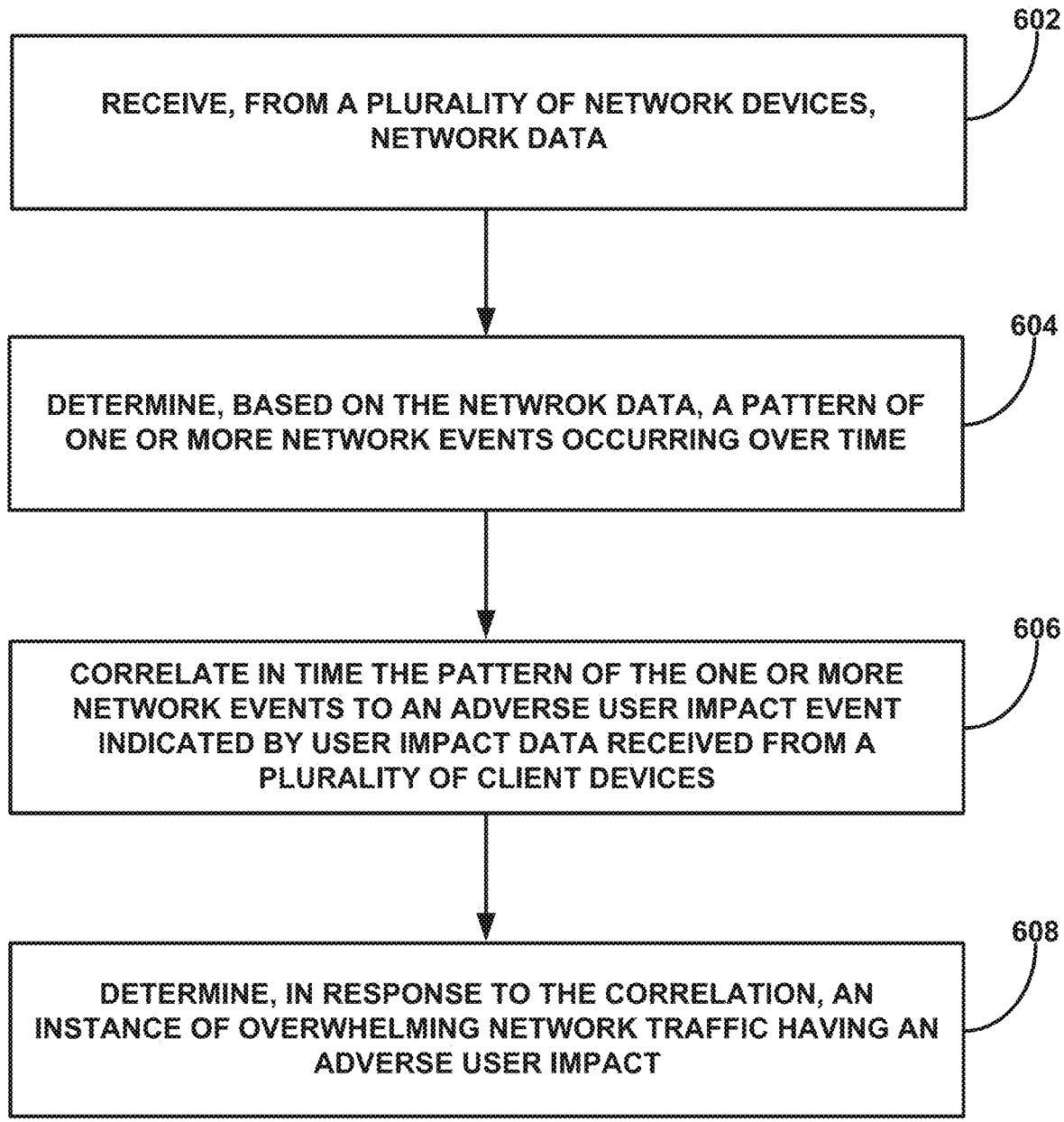
FIG. 6 is a flow diagram illustrating determining an instance of overwhelming network traffic, in accordance with one or more techniques of this disclosure.

FIG. 6 is a flow diagram determining an instance of overwhelming network traffic, in accordance with one or more techniques of this disclosure. For convenience, FIG. 6 is described with respect to network system 100 of FIG. 1. However, the techniques of FIG. 6 may be performed by different components of network system 100 or by additional or alternative devices.

NMS 150 may receive, from a plurality of network devices, network data (602). In some examples, the network data may include network traffic impact data, which indicates an impact of network traffic at one or more network devices of the plurality of network devices. In some examples, NMS 150 receives the network traffic impact data from a switch, e.g., one of switches 104). The network traffic impact data may include data indicative of a number of packets dropped at a port of the switch due to congestion on the switch port.

NMS 150 may determine, based on the network data, a pattern of one or more network events occurring over time (604). In some examples, to determine the pattern of the one or more network events occurring over time, NMS 150 may determine the pattern of the one or more network events over time in a time window, wherein the time window advances with respect to time. NMS 150 may correlate in time the pattern of the one or more network events to an adverse user impact event indicated by user impact data received from a plurality of client devices 148 (606). In some examples, the user impact data includes one or more feedback responses from a client device application feedback prompt presented to a user by an application via a client device user interface.

In some examples, NMS 150 may determine, in response to the correlation, an instance of overwhelming network traffic having an adverse user impact (608). NMS 150 may, in some examples, identify a likely or suspected root cause of the overwhelming network traffic having the adverse user impact. For example, NMS 150 may identify a set of candidate root causes, and select a likely root cause from among the candidate root causes of the set, such as based on determining a confidence score for each of the candidate root causes and select a candidate having a highest confidence score. NMS 150 may initiate a remediation action to address the overwhelming network traffic having the adverse user impact.

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (UEs), base stations, control nodes, access points and/or communications systems. Various examples are also directed to non-transitory machine, e.g., computer readable medium, e.g., ROM, RAM, CDs, hard discs, etc., which include machine readable instructions for controlling a machine to implement one or more operations of a method.

The specific order or hierarchy of steps in the processes disclosed is an example of example approaches. Based upon design preferences, the specific order or hierarchy of steps in the processes may be rearranged while remaining within the scope of the present disclosure. The accompanying method claims present elements of the various steps in a sample order and are not meant to be limited to the specific order or hierarchy presented.

In various examples devices and nodes described herein are implemented using one or more modules to perform the steps corresponding to one or more methods, for example, signal generation, transmitting, processing, and/or receiving steps. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple, or all of the steps of one or more methods of the one example aspect.

In some examples, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, steps, acts and/or operations, e.g., one or more steps described above. In some examples, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some examples. However, some examples may be practiced without these specific details. In other instances, well-known methods, procedures, components, units and/or circuits have not been described in detail for simplicity.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a Wi-Fi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 Ghz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation (s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. The functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. In general, the systems, methods and techniques disclosed herein will work equally well for other types of communications environments, networks and/or protocols.

For purposes of explanation, numerous details are set forth to provide a thorough understanding of the present techniques. The present disclosure may be practiced in a variety of ways beyond the specific details set forth herein. Furthermore, while the examples illustrated herein show various components of the system collocated, the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, the components of the system can be combined into one or more devices, or split between devices, such as a transceiver, an access point, a station, a Domain Master, a network operation or management device, a node or collocated on a particular node of a distributed network, such as a communications network. For reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure applies to include corresponding and complementary transmitter-side or receiver-side functionality, respectively, in both the same transceiver and/or another transceiver(s), and vice versa.

The examples are described in relation to enhanced communications. However, that in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software, and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols, and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

This disclosure describes systems and methods for enhancing and improving troubleshooting and remediating issues with network devices. Many alternatives, modifications and variations would be or are apparent to those of ordinary skill in the applicable arts. Accordingly, this disclosure applies to all such alternatives, modifications, equivalents, and variations that are within the spirit and scope of this disclosure.

What is claimed is:

1. A network management system (NMS) comprising:
   a memory storing network data received from a plurality of network devices configured to provide a network at a site and user impact data received from a plurality of client devices that access the network at the site, wherein the user impact data comprises data indicative of one or more feedback responses, wherein each feedback response of the one or more feedback responses comprises a response to a prompt presented to a user by a client device of the plurality of client devices, the response indicating user feedback of a quality of an application session; and
   one or more processors coupled to the memory and configured to:

determine, based on the network data, a pattern of one or more network events occurring over time;

correlate in time the pattern of one or more network events to an adverse user impact event indicated by the one or more feedback responses each indicating the user feedback; and determine, in response to the correlation, an instance of overwhelming network traffic having an adverse user impact.

2. The NMS of claim 1, wherein the network data received from the plurality of network devices comprises network traffic impact data, which indicates an impact of network traffic at the network device.

3. The NMS of claim 2, wherein the network traffic impact data is received from a switch of the plurality of network devices and comprises data indicative of a number of packets dropped at a port of the switch due to congestion on the switch port.

4. The NMS of claim 1, wherein the one or more processors are further configured to:
identify a root cause of the overwhelming network traffic having the adverse user impact; and
initiate a remediation action to address the overwhelming network traffic having the adverse user impact.

5. The NMS of claim 1, wherein to determine the pattern of one or more network events occurring over time, the one or more processors are configured to determine the pattern of one or more network events over time in a time window, wherein the time window advances with respect to time.

6. The NMS of claim 1, wherein the network data is indicative of operational behavior of the network, and wherein the network data defines a series of network events of one or more event types over a plurality of observation time periods, wherein the one or more processors are further configured to:
apply a machine learning model to the network data to dynamically determine a baseline number of occurrences of the network events in the network for each of the event types over a time period and to classify, based on the baseline number of occurrences and subsequently received network data, the one or more network events as an abnormal network event indicative of abnormal network behavior.

7. The NMS of claim 6, wherein the machine learning model comprises an unsupervised machine learning model.

8. The NMS of claim 6, wherein the machine learning model uses transferred learning information from a second network to dynamically determine the baseline number of occurrences of the network events, the transferred learning information comprising information about a number of occurrences of network events of the one or more event types in the second network.

9. The NMS of claim 6, wherein applying the machine learning model comprises applying trending analysis to identify trending behavior in the network events over the time period to classify, based on the baseline number of occurrences and subsequently received network data, the one or more of the network events as indicative of abnormal network behavior.

10. The NMS of claim 9, wherein applying trending analysis to identify trending behavior comprises performing time series pattern recognition to identify a start of the trending behavior.

11. The NMS of claim 1, wherein the one or more processors are further configured to:
determine a baseline value for the one or more network events occurring over time; and determine a trend of the one or more network events, wherein the trend is indicative of a trending change in the one or more network events relative to the baseline value, wherein the trending change comprises an increase in a number of abnormal network events relative to the baseline value.

12. The NMS of claim 1, wherein the network devices comprise one or more network switches, and wherein the network data comprises user traffic data received from the network switches that indicates increased levels of control plane traffic associated with a network protocol by which the one or more network switches attempts to negotiate a loop-free layer two (L2) forwarding topology.

13. The NMS of claim 12, wherein the network protocol comprises a spanning tree protocol (STP), and wherein the network data indicates an amount of STP messages detected.

14. The NMS of claim 1, wherein the one or more of the network events classified as abnormal network behavior includes increased proportion of broadcast, unknown- unicast or multicast (BUM) traffic in the network relative to unicast traffic in the network.

15. The NMS of claim 1, wherein the pattern of one or more network events comprises a pattern of one or more network loops.

16. The NMS of claim 1, wherein the pattern of one or more network events comprises a high volume of communications per unit time from one or more client devices of the plurality of client devices.

17. A method comprising:
receiving, by processing circuitry of a network management system (NMS), network data from a plurality of network devices configured to provide a network at a site;

receiving, by the processing circuitry, user impact data from a plurality of client devices that access the network at the site, wherein the user impact data comprises data indicative of one or more feedback responses, and wherein each feedback response of the one or more feedback responses comprises a response to a prompt presented to a user by a client device of the plurality of client devices, the response indicating user feedback of a quality of an application session;

determining, by the processing circuitry and based on the network data, a pattern of one or more network events occurring over time;

correlating in time, by the processing circuitry, the pattern of one or more network events to an adverse user impact event indicated by the one or more feedback responses each indicating the user feedback; and determining, by the processing circuitry and in response to the correlating, an instance of overwhelming network traffic having an adverse user impact.

18. The method of claim 17, further comprising:
performing, by the processing circuitry, root cause analysis of the overwhelming network traffic based on the network data to identify a suspected root cause of the overwhelming network traffic; and sending, by the processing circuitry to a network device selected from among the plurality of network devices and based on the identified root cause, instructions for the selected network device to perform an action to remediate the overwhelming network traffic.

19. A non-transitory computer-readable medium, having instructions stored thereon that, when executed, cause one or more processors of a network management system (NMS) to:

receive network data from a plurality of network devices configured to provide a network at a site;

receive user impact data from a plurality of client devices that access the network at the site, wherein the user impact data comprises data indicative of one or more feedback responses, and wherein each feedback response of the one or more feedback responses comprises a response to a prompt presented to a user by a client device of the plurality of client devices, the response indicating user feedback of a quality of an application session;

determine, based on the network data, a pattern of one or more network events occurring over time;

correlate in time the pattern of one or more network events to an adverse user impact event indicated by the one or more feedback responses each indicating the user feedback; and determine, in response to the correlating, an instance of overwhelming network traffic having an adverse user impact.

* * * * *